US010950986B2

United States Patent
Zhang et al.

(10) Patent No.: US 10,950,986 B2
(45) Date of Patent: Mar. 16, 2021

(54) CONNECTOR PROTECTION METHOD AND SYSTEM

(71) Applicant: Delta Electronics (Shanghai) CO., LTD, Shanghai (CN)

(72) Inventors: Haitao Zhang, Shanghai (CN); Daofei Xu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 283 days.

(21) Appl. No.: 15/978,277

(22) Filed: May 14, 2018

(65) Prior Publication Data

US 2019/0013628 A1 Jan. 10, 2019

(30) Foreign Application Priority Data

Jul. 5, 2017 (CN) .......................... 201710541637.5

(51) Int. Cl.
*H01R 13/66* (2006.01)
*H01R 13/70* (2006.01)
*H01R 31/06* (2006.01)
*H01R 13/713* (2006.01)

(52) U.S. Cl.
CPC ......... *H01R 13/6666* (2013.01); *H01R 13/70* (2013.01); *H01R 13/7135* (2013.01); *H01R 31/065* (2013.01)

(58) Field of Classification Search
CPC .......................... H01R 13/6666; H01R 13/70; H01R 13/7135; H01R 31/065; H02H 3/30
See application file for complete search history.

(56) References Cited

U.S. PATENT DOCUMENTS

| | | | | |
|---|---|---|---|---|
| 8,274,772 B2* | 9/2012 | Skov | ....................... | G06F 1/266 |
| | | | | 361/31 |
| 9,395,778 B2* | 7/2016 | Fritchman | ................. | G06F 1/26 |
| 10,044,217 B2* | 8/2018 | Huang | .................... | H02J 7/022 |
| 2009/0213509 A1 | 8/2009 | Dooley | | |
| 2012/0091815 A1* | 4/2012 | Richards, III | .......... | H02M 1/32 |
| | | | | 307/80 |
| 2014/0236319 A1* | 8/2014 | Richetta | ................... | H02H 5/04 |
| | | | | 700/80 |

(Continued)

FOREIGN PATENT DOCUMENTS

| CN | 103154753 A | 6/2013 |
|---|---|---|
| CN | 103513734 A | 1/2014 |

(Continued)

OTHER PUBLICATIONS

The CN3OA issued May 18, 2020 by the CNIPA.

*Primary Examiner* — Kyle J Moody
(74) *Attorney, Agent, or Firm* — Qinghong Xu

(57) ABSTRACT

The present disclosure provides a connector protection method in which the connector is used to connect a first device and a second device, and the method includes, a first detection unit of the first device detects a first parameter of the first device; a first controller of the first device obtains a second parameter from the second device through the communication line in the connector; and the first controller determines whether the connector is faulty based on the first parameter and the second parameter.

9 Claims, 4 Drawing Sheets

(56) References Cited

U.S. PATENT DOCUMENTS

| | | | | |
|---|---|---|---|---|
| 2015/0186234 A1* | 7/2015 | Hofman | ................ | G06F 11/26 |
| | | | | 714/43 |
| 2016/0274191 A1* | 9/2016 | Gerdes | ................ | G01R 31/343 |
| 2016/0322803 A1 | 11/2016 | Zaidi et al. | | |
| 2016/0329730 A1* | 11/2016 | Shiu | ................ | H02J 7/0021 |
| 2018/0267587 A1* | 9/2018 | Aldous | ................ | G06F 1/28 |
| 2018/0286609 A1* | 10/2018 | Chang | ................ | H02J 7/00 |
| 2019/0050035 A1* | 2/2019 | Sliech | ................ | G06F 1/26 |
| 2020/0103444 A1* | 4/2020 | Gupta | ................ | G05B 19/0428 |
| 2020/0119696 A1* | 4/2020 | Sun | ................ | H03F 3/195 |

FOREIGN PATENT DOCUMENTS

| | | |
|---|---|---|
| CN | 103631258 A | 3/2014 |
| CN | 104701807 A | 6/2015 |
| CN | 105244712 A | 1/2016 |
| CN | 105322397 A | 2/2016 |
| CN | 106130089 A | 11/2016 |
| JP | 2018146459 A | 9/2018 |
| WO | 2007049420 A1 | 5/2007 |

* cited by examiner

US 10,950,986 B2

CONNECTOR PROTECTION METHOD AND SYSTEM

CROSS REFERENCE

This application is based upon and claims priority to Chinese Patent Application No. 201710541637.5, filed on Jul. 5, 2017, the entire content thereof is incorporated herein by reference.

TECHNICAL FIELD

The present disclosure relates to device protection techniques, and in particular, to a connector protection system and the method thereof.

BACKGROUND

As people rely more and more on electronic products in their daily life and work, a variety of electronic devices (such as, computers, cell phones, tablets, digital cameras, personal digital assistants, MP3, navigation devices, power adapters, and etc.) need to be connected with each other by means of connectors or cables (hereinafter collectively referred to as connectors). A connector plays an important role as an interface for data and power transmission between electronic devices. Therefore, the reliability of the connector is very important. When one connector is used for power transmission, once the contact terminal of the connector is stained with foreign matters or the contact impedance increases, which may cause internal resistance of the connector increase. In this situation, there may be a risk of overheating and even causing a fire hazard. Therefore, there is a need in the art for connector over-heat protection solutions.

In the related art, generally, overheat protection of the connector is realized by providing an additional protection device for the connector, such as, a positive temperature coefficient thermistor (PTC), a circuit breaker (Breaker), a control integrated circuit (IC), or a negative temperature coefficient thermistor (NTC) temperature sensor or the like. PTC is advantageous in low cost, but the temperature sensitivity of PTC is relatively low, and the consistency is poor. After action, the impedance of PTC changes greatly so that the current cannot be completely cut-off in the event of overheating. After several actions, the current-carrying capability of PTC will deteriorate and the PTC cannot work normally, and thus cannot protect the connector any more. Compared with PTC, circuit breakers have better temperature sensitivity and better consistency, but circuit breakers are larger in volume and more expensive. Control ICs and NTC temperature sensors have even higher temperature sensitivity and higher accuracy than PTC and circuit breakers, but at the same time, the cost thereof are higher, too, and they will have negative effects on no-load loss. Therefore, there is still a need in the art for cost-saving and reliable overheat protection technology for connectors.

SUMMARY

According to a first aspect of the present disclosure, a connector protection method is provided, wherein the connector is used to connect a first device and a second device. The connector protection method includes, detecting, by a first detection unit of the first device, a first parameter of the first device; receiving, by a first controller of the first device, a second parameter from the second device through a communication line in the connector; and determining, by the first controller, whether there is a connector fault based on the first parameter and the second parameter.

According to a second aspect of the present disclosure, an electronic system is provided. The electronic system includes a first device, a second device, and a connector for connecting the first device and the second device. The first device includes a first controller and a first detection unit, wherein the first detection unit is configured to detect a first parameter of the first device. The second device comprises a second detection unit configured to detect a second parameter of the second device. The connector includes a communication line, wherein the second parameter is transmitted to the first controller through the communication line. The first controller is configured to determine whether there is a connector fault based on the first parameter and the second parameter.

According to a third aspect of the present disclosure, there is provided a computer-readable storage medium having a computer program stored thereon, wherein when the computer program is executed by a processor, the aforesaid method is performed.

DETAILED DESCRIPTION

The present disclosure will now be described in details with reference to the accompanying drawings, in conjunction with the embodiments of the present disclosure. It is to be understood that the drawings are schematic and not necessarily drawn to scale, and that the following examples and detailed description are provided by way of illustration only and are not intended to limit the disclosure in any way.

In the following detailed description, by taking an electronic system as an example, the connector protection method and system of the present disclosure is explained. It is to be understood, however, that the concept of the present disclosure may be applied to any use of a connector, not limited to an electronic system.

Figure 1:
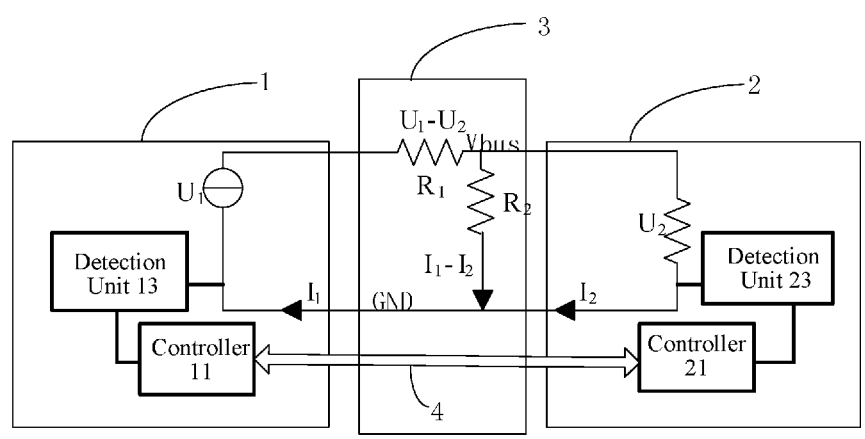
FIG. 1 is a schematic diagram of an electronic system according to one embodiment of the present disclosure.

FIG. 1 shows an electronic system according to an embodiment of the present disclosure. The electronic system includes a first device 1, a second device 2, and a connector 3 connecting the first device 1 and the second device 2. The first device 1 includes a first controller 11 and a first detection unit 13 for detecting a first parameter of the first device 1. The second device 2 includes a second detection unit 23 for detecting a second parameter of the second device 2. The connector 3 includes a communication line 4 for transmitting the second parameter to the first device 1, and the first controller 11 determines whether the connector 3 is faulty based on the first parameter and the second parameter.

In this embodiment, the first device 1 is a load and the second device 2 is a power supply; or alternatively, the first device 1 is a power supply, and the second device 2 is a load.

If the difference between the first parameter and the second parameter is greater than a first threshold, the first controller 11 of the first device 1 is further configured to output a fault signal, but the power supply continues to supply power.

When the first device 1 is a load and the second device 2 is a power supply, if the difference between the first parameter and the second parameter is greater than a second threshold, the first controller 11 of the first device 1 is further configured to generate a fault signal and transmit the fault signal to a second controller 21 of the power supply, and the second controller controls the power supply to stop supplying power in response to the fault signal.

When the first device 1 is a power supply and the second device 2 is a load, if the difference between the first parameter and the second parameter is greater than a second threshold, the first controller 11 of the first device 1 is further configured to control the power supply to stop supplying power.

The first parameter and the second parameter may be any parameters that can be measured in the system, including but not limited to the voltage and current values in the electronic system.

Optionally, in the electronic system, the second device 2 further includes a second controller 21 being further configured to obtain the first parameter through the communication line 4 and determines whether an error has occurred in the connector 3 based on the first parameter and the second parameter.

Hereinafter, reference will be made to FIG. 1, as an example, the first device is a power supply, and the second device is a load. It is to be understood that the specific device type and specific parameter values in this particular example are provided for illustrative purposes only, and are not to be construed as limiting the scope of the present disclosure in any way.

FIG. 1 shows an electronic system according to one embodiment of the present disclosure. The electronic system includes a power supply 1, a load 2, and a connector 3 for connecting the power supply 1 and the load 2. The power supply 1 and the load 2 respectively include a detection unit and a controller, and as shown in the figure, the controller of the power supply 1 and the controller of the load 2 may communicate with each other via the communication line 4 in the connector 3.

In practical applications, most of the loads have their own controllers, such as, computers, laptops, tablets, mobile phones, camcorders, scanners, and so on. Many types of power supplies have their own controllers, too. The communication line may be included in the connector or added simply by connecting the power supply and the load with a signal line, so as to the communication between the power supply and the load. In addition, the power supply generally contains over-voltage protection circuit, over-current protection circuit or overheating protection circuit. Therefore, the function of detecting the voltage, current or temperature in the power supply is also available or can be realized simply by adding voltage, current or temperature detection unit. Similarly, a lot of loads, such as laptops, also contains over-voltage, over-current protection circuit or overheat protection circuit. Therefore, the function of detecting the voltage and current in the load is also available or can be realized simply by adding voltage or current detecting units. The present disclosure is different from the conventional method in that no additional thermal element or circuit breaker is needed, but utilizes hardware inherent in the devices connected by the connector, by detecting the circuit parameters with the detection unit in the device, and performing simple calculation and comparison with the controllers in the devices, so as to realize the connector fault detection and handling functions.

In the system of FIG. 1, the voltage or current data of the power supply 1 and the load 2 may be detected in real time, and the voltage or current data may be shared between the power supply 1 and the load 2 through the communication line 4 of the connector 3. When the controller of the power supply 1 or the controller of the load 2 calculates a difference between the voltage or current, and determines that the difference is greater than a first preset value and smaller than a second preset value, the controller may determine that there is an excessive power loss on the connector, and thus it can be determined that the connector has increased contact resistance or foreign matter contamination, but there is no danger of damage to the connector. At this point, a fault signal can be output. When the difference in voltage or current is greater than the second preset value, the power supply is stopped, so as to protect the connector. The first and second preset values may be designed according to at least one of interface end contact impedance, connection line impedance, connector tolerance temperature and power handling of the different connectors in the actual application, and in consideration of some design margins.

The technical solutions of the present disclosure will be described in detail with reference to specific system design examples. Taking a laptop as an example of loads, the power supply of the laptop is a USB PD 65 W power adapter, the connector is a USB type-C connector, and the communication line is a cc pin communication cable. In such a system, the output voltage of the USB PD 65 W power adapter can be 5V/3 A, or 9V/3 A, or 15V/3 A, or 20V/3.25 A, depending on the specification of the laptop.

Referring to FIG. 1, the connector contact impedance and the connection line impedance are simplified as an equivalent resistance R1, which normally has an equivalent resistance of about 0.1 ohms. When the power supply outputs a current of 3 A, the voltage difference between the two ends of the connector 3 may be U1−U2=0.1 ohm*3 A=0.3V. When there is a loosening or poor contact between the contact pins of the connector 3, the equivalent resistance of the connector will increase, resulting in an increase in the voltage difference between the two ends of the connector. Because the product of the voltage difference and the output current is the power loss consumed on the connector, when the voltage difference is greater than the set value, it indicates that there is an excessive power loss on the connector, and thus it can be determined that there is a phenomenon that the contact impedance is increased at the interface of the connector. At this point, a fault can be output or the power supply can be stopped to protect the connector.

The preset values of the voltage difference may be set according to the actual tolerable loss of the USB type-C connector 3. When the voltage difference is greater than 1.5V there is a power loss of 1.5V*3 A=4.5 W on the connector 3. At this point, it can be determined that the connector 3 has an increase in the contact impedance at the interface end, but it will not cause the USB type-C connector 3 to be damaged or fused. At this time, the controller of the laptop 2 can be informed via the cc pin communication line 4, a fault signal is output and a warning is triggered, but the power adapter 1 is still operating normally and does not perform a power-off protection process. When the voltage difference is greater than 3.0V, there is a power loss of 3.0V*3 A=9 W on the connector 3. It can be determined that the contact impedance is too large and may cause damage or fusing of the USB type-C connector 3. At this time, the power adapter 1 immediately executes protection process, turns off the output voltage, and informs the controller of the laptop 2 with the fault information via the cc pin communication line 4 to output a fault signal indicating that an error has occurred in the connector 3. When recovered from the fault, the power adapter 1 is powered on again and output voltage normally. In this way, it can prompt the user to save files in time and protect the connector from being damaged. The above case is only an example, in which the first parameter of the power supply detected by the first detection unit is a voltage parameter, and the second parameter of the load detected by the second detection unit is a voltage parameter, but the present disclosure is not limited thereto.

Generally, the insulation resistance R2 of the Vbus and GND lines of the USB type-C connector 3 is very large, usually greater than 100 Mohm, so the leakage current is approximately zero, that is, $I1=I2$, where the current difference $I1-I2$ is close to 0. When foreign matters exist between the Vbus pin and the GND pin of the connector 3, a foreign matter impedance is generated. The output voltage is applied to the foreign matter impedance to generate a power loss, and as a result, the USB type-C connector 3 may generate heat. When the foreign matter impedance is about 40 ohm and the output voltage is 20V the current difference is $I1-I2=20V/40$ ohm=0.5 A, and there is a power loss of $20V*0.5 A=10 W$ due to the foreign matter. The power loss will cause the USB type-C connector 3 to heat up without causing damage or fusing of the USB type-C connector 3. So it can be set that when the current difference is greater than 0.5 A, the laptop 2 is informed via the cc pin communication line 4 to output a fault signal, but the power adapter 1 still works normally without disconnecting from the connector. When the current difference is greater than 1.0 A, there will be a power loss of more than $20V*1.0 A=20 W$ due to the foreign matter, which may cause damage or fusing to the USB type-C connector 3. At this time, the power adapter 1 immediately executes protection process, turns off the output voltage, and informs the laptop 2 via the cc pin communication line 4 to send a message indicating that the connector 3 has something wrong. After the connector is recovered from the fault, the power adapter 1 is powered on again to supply power normally.

The working principle of one embodiment of the present disclosure has been explained above taking the power adapter and USB type-C connector example. However, it should be understood that the disclosure is not limited thereto, and the principles of the present disclosure can also be used to protect the connector in a variety of applications where the connector is used, for example, the case of charging electric vehicles with a charging pile, and so on. The above exemplified case is only provided in an exemplary purpose, in which the first parameter of the power supply detected by the first detection unit is the current parameter, and the second parameter of the load detected by the second detection unit is the current parameter, but is not intended to limit the disclosure in any way. The first parameter and the second parameter may also be parameters corresponding to other types of power supplies and loads, and the present disclosure is not limited in this regard.

In addition, it is easy to understand that the above operations of detecting current signal and the voltage signal, and calculating the current difference and the voltage difference can be performed either by the detection unit and the controller of the power supply, or by the detection unit and the controller of the load, or can be performed by the cooperation of the detection units and the controllers of the devices connected by the connector, and the present disclosure is not limited thereto.

As can be seen from the above content, the technical solution of the present disclosure does not need to add any additional hardware. It can realize the function of connector protection by means of voltage or current detection and simple calculation, using the components of the power supply and load themselves that are connected at both ends of the connector. Thereby, according to the solution of the present disclosure, not only additional hardware cost is saved, but also the space that may be occupied by the additional hardware is saved.

It should be noted that the method for performing connector protection can be implemented by program instructions. In this case, it is possible to store the program instructions in the memory, the processor or the controller of the power supply or the load in advance before leaving the factory. Alternatively, the power supply or the load can perform the connector protection function disclosed in the present disclosure, by downloading and installing the corresponding program at the retail store or by the user.

Figure 2:
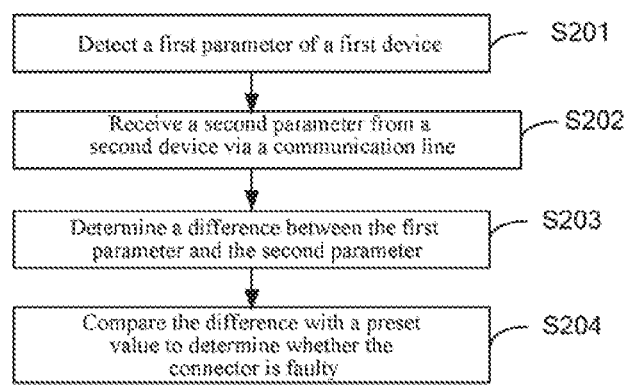
FIG. 2 is a flow chart of a connector protection method according to an embodiment of the present disclosure.

FIG. 2 is a flow chart of a connector protection method according to an embodiment of the present disclosure. The connector connects the first device and the second device. As shown in FIG. 2, the method includes the following steps. In S201, a first parameter of the first device 1 is detected. In S202, a second parameter is received from the second device 2 via the communication line 4. In S203, a difference between the first parameter and the second parameter is deter lined. In S204, the difference is compared with a preset value so as to determine whether there is a connector fault.

In this embodiment, the first device 1 may be a load and the second device 2 may be a power supply. Alternatively, the first device 1 may be a power supply and the second device 2 may be a load.

Optionally, the method further includes the following step. In response to the difference between the first parameter and the second parameter being greater than a first threshold, the first controller outputs a fault signal, but the power supply continues to supply power normally.

Optionally, the method further includes the following step. If the first device 1 is a load and the second device 2 is a power supply, in response to the difference between the first parameter and the second parameter being greater than a second threshold, the first controller 11 generates a fault signal and transmits the fault signal to a second controller 21 of the power supply, and the second controller 21 controls the power supply to stop supplying power in response to the fault signal.

Optionally, the method further includes the following step. If the first device 1 is a power supply and the second device 2 is a load, in response to the difference between the first parameter and the second parameter being greater than a second threshold, the first controller 11 controls the power supply to stop supplying power.

For example, the power supply can be a power adapter, and the load can be a laptop, and the connector can be a USB type-C connector.

In this method, the first parameter and the second parameter are either one of the voltage value and the current value, or any other signal that can reflect the state of the first device 1 and the second device 2.

In the above method, the first controller 11 of the first device 1 can receive the second parameter of the second device 2 via the communication line 4, and it may be determined whether there is a connector 3 fault based on the first parameter and the second parameter. Alternatively, the second controller 21 of the second device 2 can receive the first parameter of the first device 1 via the communication line 4, and it may be determined whether there is a connector 3 fault based on the first parameter and the second parameter. Or, alternatively, the power supply and the load communicate the first and second parameters to each other via the communication line, and the controllers of power supply and the load determine whether there is connector fault based on the first parameter and the second parameter.

Figure 3:
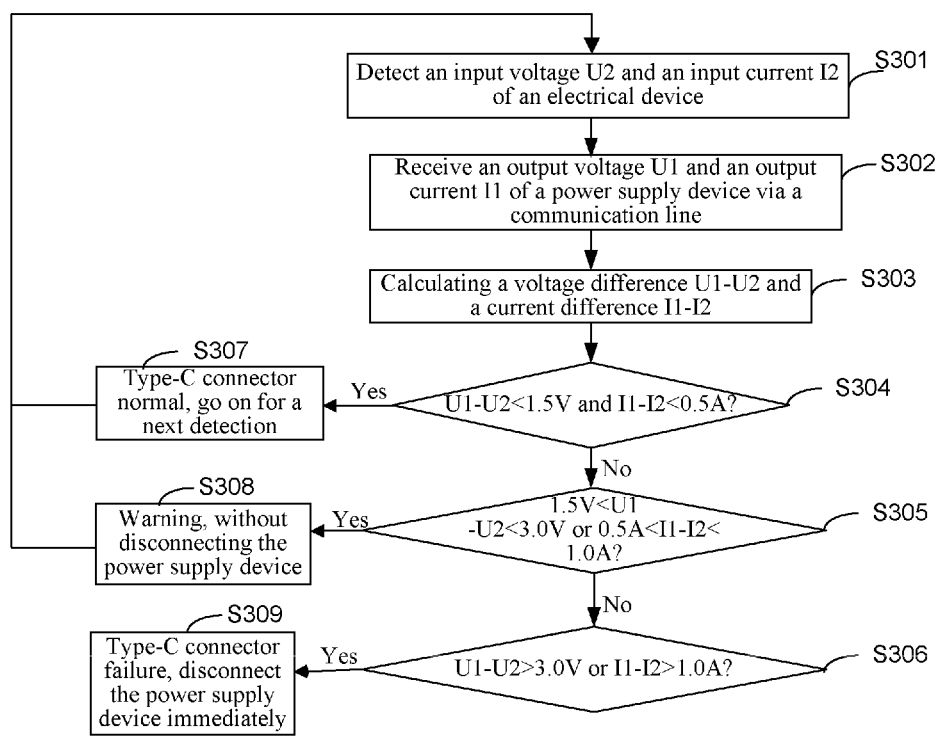
FIG. 3 is a flow chart of a connector protection method executed by the electronic system as shown in FIG. 1.

The method performed in the electronic system shown in FIG. 1 will be described below with reference to FIG. 3. As shown in FIG. 3, In S301, the input voltage U2 and the input current I2 of the load are detected. In S302, the output voltage U1 and the output current I1 of the power supply is communicated via the communication line. In S303, the voltage difference U1–U2 and the current difference I1–I2 are calculated. In S304, it is determined whether or not U1–U2<1.5V and I1–I2<0.5 A are satisfied. If yes, then the USB type-C connector is normal, and the process proceeds to S307 to prepare for the next detection. Otherwise, the process proceeds to step S305. In S305, it is determined whether or not 1.5V<U1–U2<3.0V or 0.5 A<I1–I2<1.0 A is satisfied. If yes, it indicates that there is an excessive power loss on the connector, and thus it can be determined that the connector has increased contact resistance or foreign matter contamination, but there is no danger of damage to the connector. Then, the process proceeds to S308 to warn the user that the connector may be contaminated with foreign matter, and the power supply continues to supply power. Otherwise, the process proceeds to step S306. In S306, it is determined whether or not UI–U2>3.0 V or I1–I2>1.0 A is satisfied. If yes, the process proceeds to S309, and it is determined that the connector has failed, and the power supply stops supplying power to protect the connector from overheating.

The specific values used in the above embodiments are designed according to the parameters in the example shown in FIG. 1, and are provided only to assist in understanding the present disclosure. It should be understood that the preset values should be designed according to interface end contact impedance, connection line impedance, temperature tolerance and power tolerance of the different connectors in the actual application, and in consideration of some design margins.

In the above embodiment, the connector protection method that is performed mainly by the controller of the load has been described as an example. However, it should be understood that the corresponding steps of the method can also be performed by the controller of the power supply, by receiving the input voltage and the input current from the load via the communication line.

It is to be understood that the steps of the above method need not be performed in sequence, and one or more of the steps may be omitted, or one or more additional steps may be added if necessary.

The present disclosure also provides a computer-readable storage medium, having a computer program stored thereon. When the computer program is executed by a processor, the method as described above will be performed.

Figure 4:
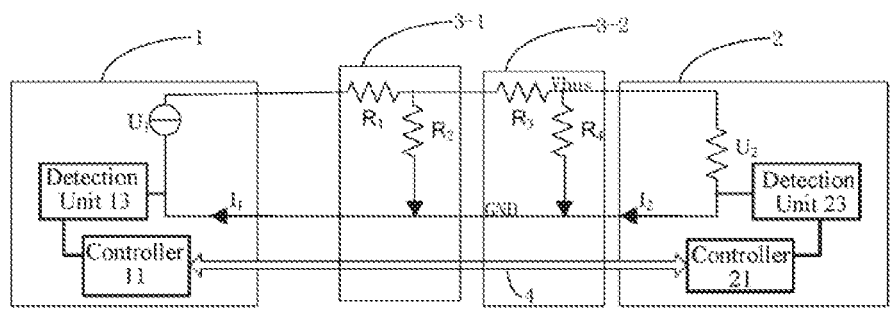
FIG. 4 is a schematic diagram of an electronic system according to another embodiment of the present disclosure.

In addition, FIG. 4 shows an electronic system according to another embodiment of the present disclosure. As shown in FIG. 4, the electronic system may include more than one connector. FIG. 4 shows two connectors 3-1 and 3-2, however, it should be understood that the system may also include more than two connectors. When using two or more connectors, these connectors can be of the same type, or be of different types.

The working principle of the system shown in FIG. 4 is similar to that described with reference to FIG. 1. Firstly, the voltage and current of the power supply 1 and the load 2 are detected in real time, and then, the voltage and current data are shared between the power supply 1 and the load 2 through the communication line of the connector. When the controller of the power supply or the load determines that the difference between the voltage or current is greater than the first preset value and smaller than the second preset value, it indicates that there is an excessive power loss on the connector, thus it can be determined that the connector has increased contact resistance or has foreign matters thereon, but there is no danger of damaging the connector. At this point, a fault signal can be output but the power supply continues to supply power normally. If the difference in voltage or current is greater than the second preset value, it can be determined the connector is at the risk of damage, and thus the power supply is controlled to stop supplying power to protect the connector from overheating. The first and second preset values are designed according to interface end contact impedance, connection line impedance, temperature tolerance and power tolerance of the different connectors in the actual application, and in consideration of some design margins.

According to the method and system of the present disclosure, it is possible to dorm connector fault detection and control functions by using the controller, the communication line and the detection unit, which are inherent in the power supply or in the load without changing the structure of the connector. The difference between the first parameter of the power supply and the second parameter of the load is used to determine, whether there is an increased contact impedance of the connector or connector failure which may be caused by foreign matter contamination. A fault signal can be output and protection processing can be performed in case of connector fault, by communicating the first parameter and the second parameter data of the power supply and the load via the communication line, and causing the controller to perform a calculation and determination process. In the application, it is only necessary to change the preset values of the difference between the first parameter and the second parameter built in the controller, so as to easily adjust the parameters of the warning and power protection of the connector. Therefore, the method and system of the present disclosure have the characteristics of low hardware cost and high flexibility.

The above figures are merely illustrative of the processing included in the method according to an exemplary embodiment of the present disclosure, and are not intended to be limiting, and the processing shown in the above figures does not indicate or limit the chronological order of these processes. In addition, it will be understood that these processes may be, for example, synchronized or asynchronous performed in multiple units, unless otherwise specified.

Exemplary embodiments of the present disclosure have been particularly shown and described above. It is to be understood that the disclosure is not limited to the detailed construction, arrangement, or method of implementation described herein. The scope of protection of the disclosure is defined only by the appended claims and various modifications and variations should fall within the scope of the claims.

What is claimed is:

1. A method for implementing fault protection of a connector between a first device and a second device, comprising:

detecting, by a first detection unit of the first device, a first parameter of the first device;

receiving, by a first controller of the first device, a second parameter from the second device through a communication line of the connector; and determining, by the first controller of the first device, whether there is a connector fault based on the first parameter and the second parameter, wherein the first device is a load and the second device is a power supply, or the first device is a power supply and the second device is a load, wherein the first controller of the first device outputs a fault signal, and the power supply continues to supply power, if a difference between the first parameter and the second parameter is greater than a first threshold and less than a second threshold, wherein when the first device is the load and the second device is the power supply, the first controller of the first device generates a fault signal and transmits the fault signal to a second controller of the second device to control the power supply to stop supplying power, if a difference between the first parameter and the second parameter is greater than a second threshold, wherein when the first device is the power supply and the second device is the load, the first controller of the first device controls the power supply to stop supplying power, if a difference between the first parameter and the second parameter is greater than a second threshold.

2. The method according to claim 1, wherein the power supply is a power adapter and the connector is a USB type-C connector.

3. The method according to claim 1, wherein the first parameter and the second parameter are voltage values or current values.

4. The method according to claim 1, further comprising: receiving, by a second controller of the second device, the first parameter from the first device through the communication line and determining whether there is a connector fault based on the first parameter and the second parameter.

5. A non-transitory computer-readable storage medium having a computer program stored thereon, wherein the computer program executes the method according to claim 1 when it is executed by a processor.

6. An electronic system comprising a first device, a second device, and a connector for connecting the first device and the second device, wherein:

the first device comprises a first controller and a first detection unit configured to detect a first parameter of the first device;

the second device comprises a second detection unit configured to detect a second parameter of the second device;

the connector comprises a communication line, wherein the second parameter is transmitted to the first controller through the communication line, and the first controller is configured to determine whether there is a connector fault based on the first parameter and the second parameter, wherein the first device is a load and the second device is a power supply, or the first device is a power supply and the second device is a load, wherein the first controller of the first device outputs a fault signal, and the power supply continues to supply power, if a difference between the first parameter and the second parameter is greater than a first threshold and less than a second threshold, wherein when the first device is the load and the second device is the power supply, the first controller of the first device generates a fault signal and transmits the fault signal to a second controller of the second device to control the power supply to stop supplying power, if a difference between the first parameter and the second parameter is greater than a second threshold, wherein when the first device is the power supply and the second device is the load, the first controller of the first device controls the power supply to stop supplying power, if a difference between the first parameter and the second parameter is greater than a second threshold.

7. The electronic system according to claim 6, wherein the power supply is a power adapter and the connector is a USB type-C connector.

8. The electronic system according to claim 6, wherein the first parameter and the second parameter are voltage values and current values.

9. The electronic system according to claim 6, wherein the second device further comprises a second controller, the second controller is further configured to obtain the first parameter through the communication line and determine whether the connector is faulty based on the first parameter and the second parameter.

* * * * *